April 9, 1929.   A. V. CLELAND   1,708,604
SEED HULLER
Filed May 27, 1925   3 Sheets-Sheet 1

Inventor
ANDREW V. CLELAND
By Paul, Paul & Moore
ATTORNEYS

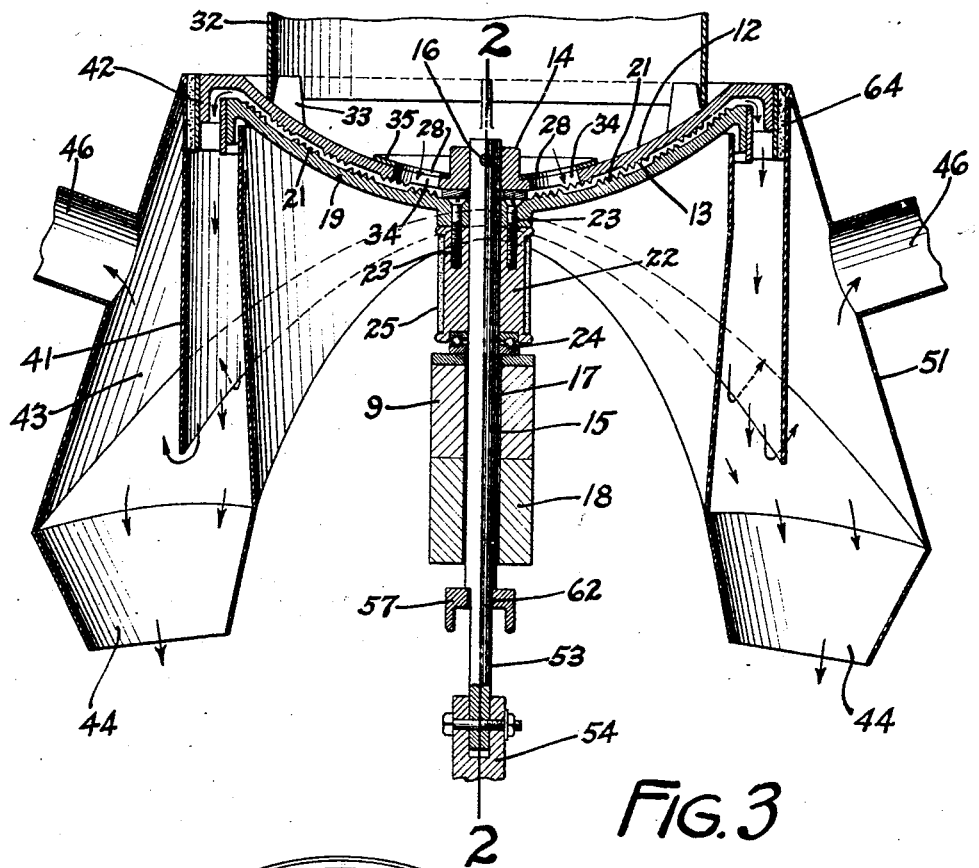
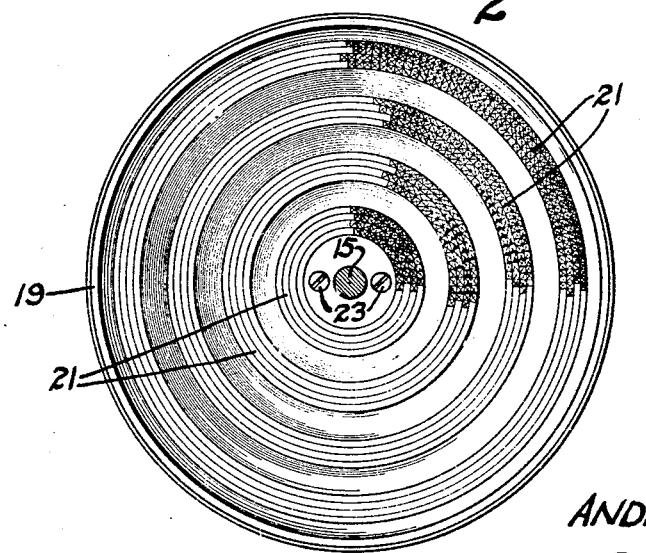
Fig. 3
Fig. 5
Inventor
ANDREW V. CLELAND
By Paul, Paul Hlloor
Attorneys Patented Apr. 9, 1929.

1,708,604

UNITED STATES PATENT OFFICE.

ANDREW V. CLELAND, OF MINNEAPOLIS, MINNESOTA.

SEED HULLER.

Application filed May 27, 1925. Serial No. 33,155.

This invention relates to improvements in seed hullers or scarifiers particularly adapted for use for removing the hulls from small seeds such, for instance as clover seeds, and more particularly relates to such a device wherein the hulls are removed from the seeds by a rubbing action as they pass through the machine.

An object of the invention is to provide a seed huller wherein the seeds are fed through by centrifugal force, and having a plurality of teeth provided therein between which the seeds must pass in being fed through the machine, thereby causing the hulls on the seeds to be scraped or rubbed off the seeds before being discharged from the machine.

A further object of the invention is to provide such an apparatus comprising a stationary bowl-shaped member having rows of teeth arranged on the lower surface thereof, and having a similarly shaped member rotatably mounted directly therebeneath and in spaced relation thereto, and which member is likewise provided with rows of teeth so that when the seeds are outwardly fed between the two members by centrifugal force, the hulls will be removed therefrom by contacting with the teeth.

A further object is to provide a device for removing the hulls from small seeds and also having means for removing therefrom fine particles of foreign material such as dust, while the seeds are being passed through the machine.

A further object is to provide a seed huller of simple and inexpensive construction, comprising few parts, and having means whereby it may readily be adjusted to seeds of various sizes.

The particular object of the invention, therefore, is to provide an improved seed huller.

Other objects of the invention will appear from the following description and will be pointed out in the annexed claims.

In the drawings, there has been disclosed a structure designed to carry out the various objects of the invention but it is to be understood that the invention is not confined to the exact features shown as various changes may be made within the scope of the claims which follow.

In the accompanying drawings forming part of this specification,

Figure 3 is an enlarged detail sectional view showing the means provided for removing the hulls from the seeds;

Figure 5 is an enlarged plan view of the lower bowl member showing the preferred arrangement of the teeth provided on the surface thereof.

Figure 1:
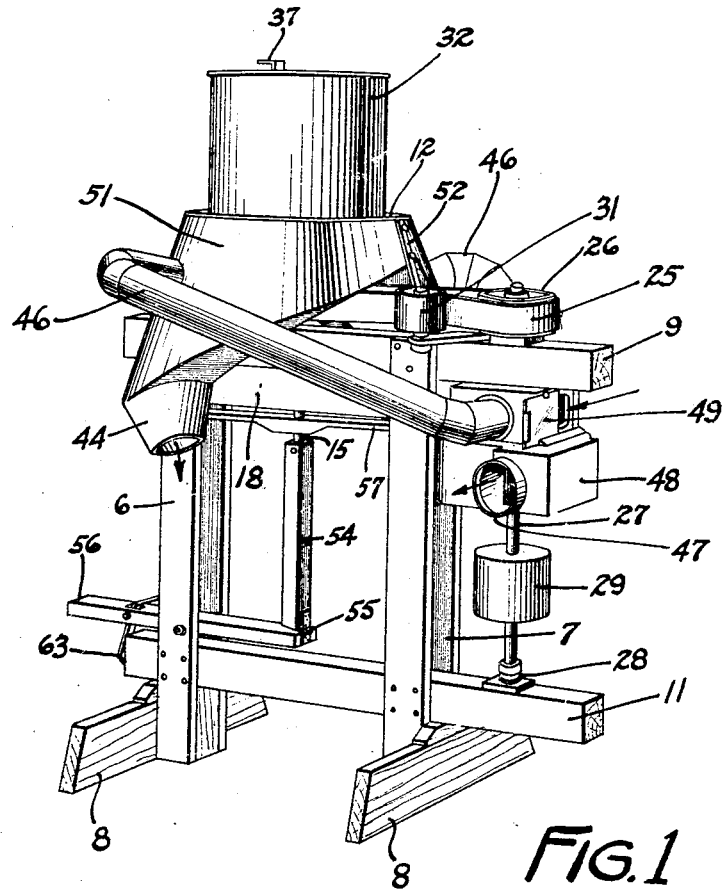
Figure 1 is a view in perspective of the improved seed huller.
Figure 2:
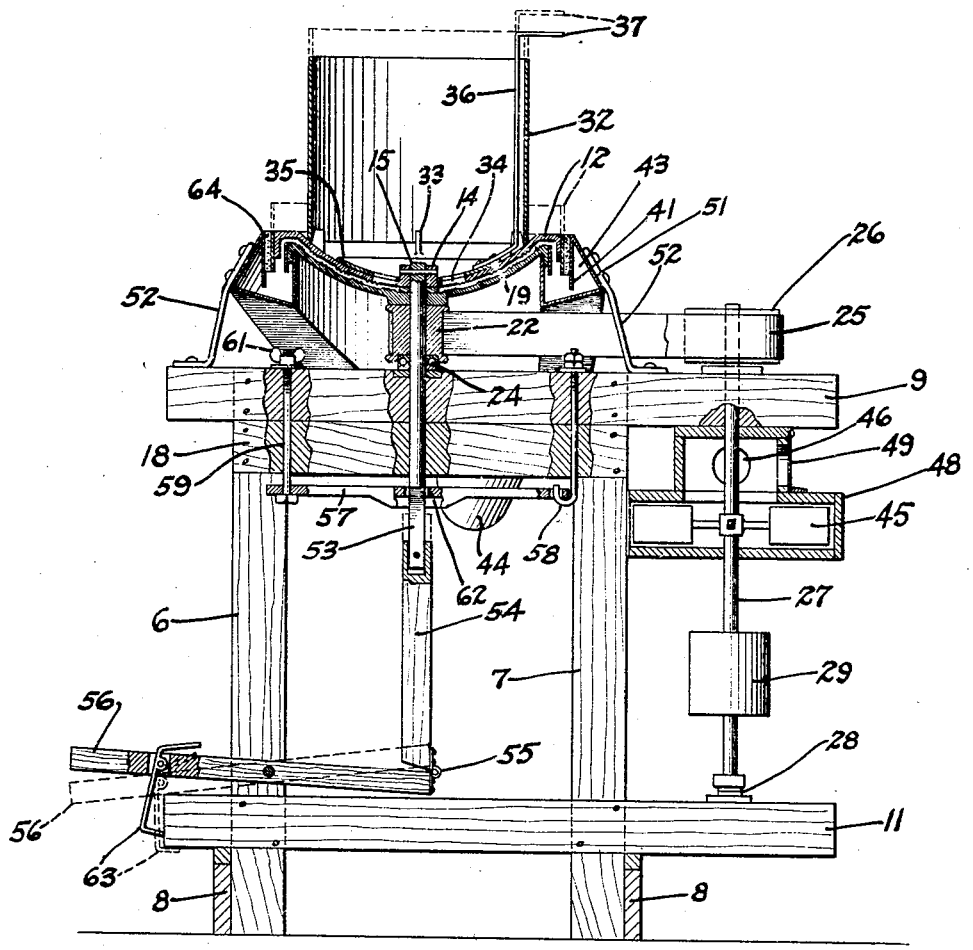
Figure 2 is a vertical sectional view on the line 2—2 of Figure 3.

The novel seed huller featured in this invention preferably comprises the upright frame members 6 and 7 having suitable cross members or base rails 8 secured to the lower ends thereof as shown in Figures 1 and 2. The upright frame members 6 and 7 are suitably secured together by means of the uppper and lower horizontal beams 9 and 11 thereby providing a substantially rectangular frame as shown in Figure 2.

An important feature of this invention resides in the novel means provided for removing the hulls from the seeds as they are fed therethrough by centrifugal force. Such means preferably consists of a shallow stationary bowl-shaped member 12 having rows of teeth 13 provided upon the lower convexed surface thereof as shown in Figure 3. The bowl-shaped member 12 is provided with a central hub 14 bored out to receive the upper end of a shaft 15 to which the member 12 is secured by such means as the pin 16. The shaft or rod 15 is slidably mounted in a guide 17 provided in the upper frame member 9 and a relatively shorter frame member 18 which is mounted directly beneath the frame member 9 and is similarly secured to the upright frame members 6 and 7, (see Figures 1 and 2).

A complementary shallow bowl-shaped member 19 is mounted directly beneath the stationary member 12 in spaced relation thereto as shown. In like manner, this lower bowl member has a plurality of teeth 21 provided in the upper concaved surface thereof, and which teeth are also arranged in spaced rows as shown in Figure 5. Referring to Figure 3, it will be noted that the spacing of the rows of teeth 13 and 21 in the two bowl members 12 and 19 is such that they will be arranged in staggered relation to each other when the two members are assembled as shown in Figure 3. By thus arranging the rows of teeth on the two bowl members, the teeth will not contact with one another when the lower member is being rotated, should the upper bowl member 12 be adjusted relatively close to the lower bowl member.

A pulley 22 is mounted on the shaft or rod 15 and is secured to the lower central portion of the lower bowl member 19 by such means as bolts or screws 23. A suitable thrust bearing 24 is interposed between the pulley 22 and the upper surface of the horizontal frame member 9 to carry the weight of the bowl member 19 and to minimize friction as much as possible. A belt 25 operatively connects the pulley 22 with a relatively larger pulley 26 mounted upon a vertical drive shaft 27 supported by bearings provided in the horizontal frame members 9 and 11. The lower end of the shaft 27 is preferably supported by a suitable thrust bearing 28 as shown in Figure 2. A drive pulley 29 is also mounted upon the shaft 27 to provide means whereby the machine may be operatively connected to a suitable source of power, not shown. An idler pulley 31 is adjustably mounted upon the upper horizontal frame member 9 to provide means for taking up slack in the belt 25.

Figure 4:
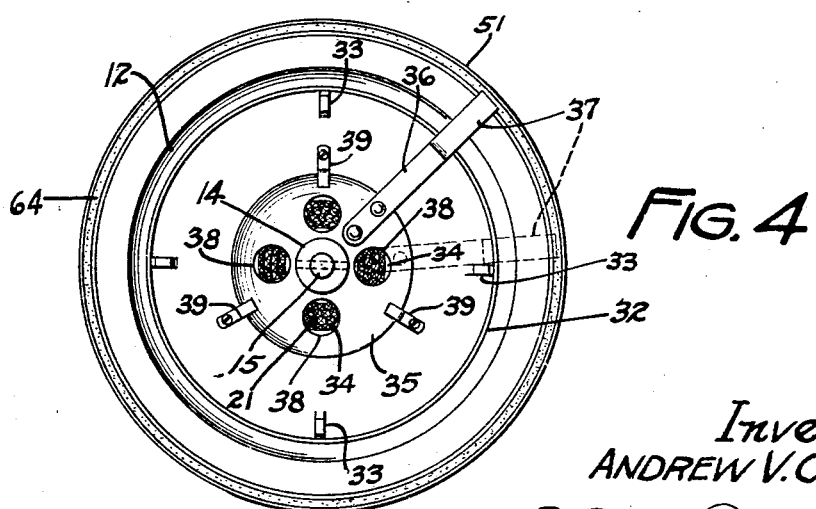
Figure 4 is a plan view of the machine hopper showing the shutter or valve mechanism provided in the bottom thereof for regulating and controlling the feed of the material through the machine.

The means provided for feeding the material or seeds into the machine preferably consists in a hopper 32 mounted upon the upper bowl member 12 and preferably retained in axial alignment therewith by means of a plurality of lugs 33 provided upon the upper surface of the member 12. Referring to Figures 3 and 4, it will be noted that the upper bowl 12 has a plurality of apertures 34 formed in the lower central portion thereof through which the material is fed from the hopper 32 into the narrow gap or space between the two bowls 12 and 19. A circular plate 35 is rotatably mounted upon the hub 14 and is provided with an operating lever or handle 36 which upwardly extends through the hopper 32 and has a hand grip 37 formed at the upper end thereof whereby the plate 35 may be rotated to control the feeding of the material or seeds through the machine. As shown in Figure 4, the plate 35 is provided with a similar number of apertures 38, which by rotation of the plate 35, may be brought into registration with the apertures 34 in the upper bowl 12. By the employment of this novel device, it will readily be seen that by relatively rotating the plate 35 within the upper bowl 12, the flow of material through the openings 38 and 34 may be regulated and controlled at will, and also, if desired, the feeding of the material from the hopper 32 may be completely interrupted or shut off by simply rotating the plate 35 until the apertures 38 therein are moved completely out of alignment with the apertures 34 in the upper bowl 12. Clips 39 may be provided to retain the plate 35 in abutting relation or contact with the upper central surface of the bowl 12, (see Figure 4).

Means are also provided for downwardly directing the hulled seeds and hulls removed therefrom to a suitable receiving means as they are centrifugally and circumferentially discharged from between the bowl members 12 and 19 during the operation of the machine. Such means preferably consists in the provision of a depending deflector plate or skirt 41 mounted to encircle the upper stationary bowl member 12 as shown in Figure 3. It will be noted in this figure that the upper bowl 12 is also provided with a peripheral flange 42 which also functions to downwardly direct the seeds and hulls as they are discharged from between the two bowl members 12 and 19 as indicated by the arrows. This plate 41 is mounted in an annular chamber 43 which is in communication with the gap between the bowl members 12 and 19 and is provided with discharge openings or spouts 44 through which the hulled seeds and the removed hulls may be discharged into a suitable receiving means, not shown. The bottom of the annular chamber 43 is preferably inclined as shown in order to downwardly direct the material discharged thereinto from the bowl members into the receiving means positioned beneath the discharge openings 44.

In the operation of this novel seed huller and scarifier, the seeds are fed through the openings 34 and onto the surface of the rapidly rotating lower bowl member 19. As a result of the rapid rotation of this lower member, the seeds will be fed outwardly by centrifugal force between the two bowls 12 and 19 and between the rows of teeth 13 and 21 provided on the surfaces thereof, thereby causing the hulls to be substantially rubbed or scraped from the seeds with the result that when the seeds are delivered into the annular chamber 43 the hulls will be removed therefrom.

A suction fan 45 is preferably mounted upon the drive shaft 27 and is connected by means of air trunks 46 to opposite sides of the annular chamber 43, as shown in Figures 1 and 3. The purpose of this fan is to remove the lighter foreign material such as dust from the hulled seeds as they are discharged into the chamber 43 for subsequent discharging into a suitable receiving means through the openings 44. An outlet 47 is provided on the fan casing 48 to provide means for piping the dust to a suitable receiving means, not shown. A sliding valve or gate 49 is also preferably provided upon the upper portion of the fan housing 48 to provide means for controlling and regulating to the proper degree, the suction in the trunks 46. The casing 51 forming the annular chamber 43, may be conveniently supported upon the upper horizontal frame member 9 by such means as the brackets 52, shown in Figure 2.

Means are also provided in this novel seed huller for conveniently adjusting the width of the gap between the bowl members 12 and 19 in order that it may be adjusted to different sizes of seeds. Such means preferably consists in securing to the lower flattened end portion 53 of the shaft or rod 15 an extension 54 having a hinged connection 55 with a foot pedal 56 pivotally mounted upon the frame as shown. When pressure is applied to the foot pedal 56, and it is downwardly moved, an upward movement will be imparted to the upper bowl member 12 thereby increasing the width of the gap between the two bowls 12 and 19. A yoke 57 is also provided to limit the downward movement of the shaft 15 and therefore the upper bowl 12 to prevent it from coming in direct contact with the upper surface of the lower rotatable bowl member 19. One end of this yoke is preferably supported by means of a hook 58 secured to the frame, as shown, and the opposite end thereof is adjustably supported by means of a bolt 59 having a wing nut 61 mounted upon the upper end thereof whereby the gap between the two bowl members may be relatively adjusted to variant sizes of seeds. The yoke 57 is centrally provided with an elongated opening 62 adapted to receive the flattened end portion 53 of the shaft 15, so that adjustment of the yoke 57 will impart a similar movement to the shaft 15 and therefore the upper bowl member 12.

A latch 63 is preferably provided upon the foot pedal 56 adapted to engage the lower face of the horizontal frame member 11 when the foot pedal is downwardly moved to the position shown in dotted lines in Figure 2. By the provision of this latch, the foot pedal may readily and conveniently be locked in its lowermost position so that the upper bowl member 12 may be held a considerable distance from the lower bowl 19, which has been found of considerable advantage should a stone accidentally be fed into the machine.

A suitable packing 64 is preferably interposed between the flange 42 of the upper bowl member 12 and the depending plate or deflector 41 so as to provide a substantially air-tight connection therebetween. This packing is of sufficient width to allow the upper bowl member 12 to be relatively vertically adjusted within the deflector 41 without becoming separated therefrom.

Referring to Figure 3, it will be noted that as the material is discharged from between the two bowl members 12 and 19 and into the annular chamber 43, it will be precipitated into the bottom thereof and discharged through the openings 44. As a result of the deflector plate 41, it will be impossible for any of the seeds to be upwardly drawn or lifted into the air trunks 46 by the suction of the air as the width of the plate 41 is such as to allow only the lighter material to be upwardly drawn into the outer portion of the chamber 43 and into the suction trunks 46.

From the foregoing, therefore, it will readily be seen that practically all kinds of small seeds may be hulled by being fed through this novel machine. Its construction is also such that it comprises very few parts, and all such parts are so arranged that they can not possibly become derranged or out of adjustment while the machine is in operation, thereby providing a machine which will be substantially foolproof and efficient in operation.

In addition to its function of removing the hulls from seed, the machine is adapted for scratching or scarifying the shell of the seed and particularly seeds generally known as hard or the kind having comparatively thick shells and on that account very slow of germination unless the shell is scratched or abraded. By passing such seeds through my machine, the hard shell becomes scratched or cut so that when the seeds are planted, moisture may readily penetrate the seed and cause germination within the normal period. This scratching or abrading of the seed shell is accomplished by the passage of the seeds between the toothed and smooth surfaces of the cooperating bowl members, sufficient space being provided between the members to prevent any danger of crushing or grinding the seeds during such passage.

I claim as my invention:

1. A seed huller and scarifier, comprising a frame, a revolvable member, and a slidable non-revolvable member mounted in said frame and having opposing toothed convex and concave surfaces, and a closed casing arranged to receive the hulls and seeds, and attached to and movable with said non-revolvable member.

2. A machine of the class described comprising a frame, relatively revoluble members mounted therein having opposing surfaces between which the seeds to be hulled are fed outwardly by centrifugal force, the surfaces of each member having ring-like toothed and smooth areas, with the toothed areas of one member overlying the smooth areas of the other member.

3. A machine of the class described comprising relatively revoluble members arranged one above the other in spaced relation, the opposing faces of said members having means for separating the hulls from the seeds, means for delivering the seeds to be hulled to the space between said members to be thrown outwardly therebetween by centrifugal force, and a closed casing arranged to receive the hulls and seeds and having a bottom slanting downwardly from a central point in opposite directions and leading to seed discharge openings, and a partition dividing the casing vertically, and spaced from the bottom, said casing having husk discharge openings in its outer wall above the level of the seed discharge openings.

4. A machine of the class described comprising a lower revoluble member having a concave upper surface, an upper non-rotatable member mounted for vertical adjustment toward and from said lower member said mount including a shaft translatable through the lower member and said upper member having means for delivering the seeds to be hulled to the space between them, the opposing faces of said members having means for removing the hulls from the seeds, and means for collecting the seeds and hulls so separated.

5. A machine of the class described comprising a lower revoluble member having a concave upper surface, an upper stationary member having a convex under surface, the opposing surfaces of said members having means for removing the seed hulls, said upper member having seed receiving openings therein and a hopper for delivering the seed to the space between said members, means for collecting and separating the seeds and hulls discharged from between said members, and means for adjusting the upper member vertically, including a non-rotatable shaft translatable through said lower member.

6. A machine of the class described comprising a frame, upper and lower relatively revoluble members mounted therein, the opposing faces of said members having circular concentric toothed and smooth areas alternately arranged, the toothed areas of one member being opposite the smooth areas of the other member and separated therefrom, means for delivering the seeds to be hulled between said members to be thrown outwardly by centrifugal force, and means for collecting the seeds and hulls so separated.

7. In a machine of the class described, upper and lower relatively revoluble members having opposing faces provided with means for removing the hulls of the seeds fed between them, the seeds and hulls being thrown outwardly by centrifugal force between said members, a trunk adapted to receive the seeds and hulls and having a depending partition having its lower edge spaced from the bottom of the trunk, the lower wall of said trunk being downwardly slanted in opposite directions and having gravity discharge openings at the lowest level for the clean seed, and said trunk having a suction pipe connection above the lower portion of said baffle plate for creating a suction below said partition to separate the waste material from the seed.

8. A machine of the class described comprising a frame, a lower revoluble member mounted in said frame, an upper normally stationary member adjacent said lower member and having an under surface adapted to cooperate with the upper surface of said lower member to remove the seed hulls or scarify the seeds, said upper member having feed openings therein and a hopper adapted to deliver the seeds through said openings to the space between said members, a shaft and an emergency treadle device for rapidly raising said upper member to increase the space between said members, and means for receiving and separating the seeds and hulls thrown outwardly by centrifugal force from between said members.

9. A machine of the class described comprising a frame, relatively revoluble members mounted in said frame and having opposing convex and concave surfaces, and means for feeding the seeds to be hulled or scarified between them, said surfaces having cooperating toothed and smooth areas between which the seeds are fed and thrown outwardly by centrifugal force, a shaft translatably mounted and supporting one of said members, means for raising and lowering said shaft and the member thereon to adjust the distance between the opposing surfaces of said members for the purpose specified.

10. A machine of the class described comprising a frame, upper and lower relatively revoluble members mounted in said frame having opposing convex and concave surfaces with toothed areas thereon and means for feeding the seeds to be hulled or scarified between said members, the seeds being thrown outwardly by centrifugal force, an annular trunk encircling the peripheries of said members and adapted to receive the seeds and hulls, the lower wall of said trunk slanting downwardly at opposite sides and having discharge openings for the seeds, a fan casing and fan therein, a suction pipe connecting the upper portion of said trunk with said fan casing, and means in said trunk for directing the seeds and hulls downwardly therein below the entrance to said suction pipe.

11. A bowl-shaped member slidably supported and having teeth upon its convex surface, and apertures adjacent its center, a hopper carried by said member, and means for controlling the feed from said hopper through the apertures, a complemental bowl-shaped member spaced beneath said first member, rotatably mounted, and having teeth upon its concave surface, a shaft traversing and slidable through the lower member, and a pulley attached to and rotatably supporting the lower member and rotatable about the shaft.

12. A bowl-shaped member slidably supported and having teeth upon its convex surface, and apertures adjacent its center, a hopper carried by said member, and means for controlling the feed from said hopper through the apertures, a complemental bowl-shaped member spaced beneath said first member, rotatably mounted, and having teeth upon its concave surface, a shaft traversing and slidable through the lower member, a pulley attached to and rotatably supporting the lower member and rotatable about the shaft, a casing enclosing the bowl-shaped members extending therebelow and having its bottom slanting downwardly in opposite directions, and having seed discharge orifices at the lowest level, and having chaff discharge orifices at points vertically above the seed discharge orifices, and a partition dividing the casing vertically into inner and outer annular chambers, and having its lower end spaced upwardly from the casing bottom.

13. A bowl-shaped member slidably supported and having teeth upon its convex surface, and apertures adjacent its center, a hopper carried by said member, and means for controlling the feed from said hopper through the apertures, a complemental bowl-shaped member spaced beneath said first member, rotatably mounted, and having teeth upon its concave surface, a shaft traversing and slidable through the lower member, a pulley attached to and rotatably supporting the lower member and rotatable about the shaft, a casing enclosing the bowl-shaped members extending therebelow and having its bottom slanting downwardly in opposite directions, and having seed discharge orifices at the lowest level, and having chaff discharge orifices at points vertically above the seed discharge orifices, and a partition dividing the casing vertically into inner and outer annular chambers, and having its lower end spaced upwardly from the casing bottom, said partition acting as a guide for the upper bowl-shaped member, a suction apparatus having its suction side connected with said chaff discharge orifices, including a fan shaft, and belt connections between said shaft and pulley.

14. A device of the class described, comprising a drum having an inner substantially vertical wall, and an outer downwardly outwardly slanting wall, and a broad bottom slanting downwardly in opposite directions, and having seed discharge openings at the lowest level, a partition depending from the upper edge of the outer wall and having its lower end spaced above the bottom, said outer wall having chaff discharge openings above the seed discharge openings, a husking disk having seed feed openings adjacent its center, said disk mounted to slide upon the partition, a second disk below the first having a flange overhanging the inner wall of the drum, said lower disk having a pulley rotatably supporting it, and a shaft slidably traversing the pulley and lower disk and supported to the upper disk.

15. A seed huller and scarifier comprising a frame, horizontal rotatable grinder members opposingly related, a closed casing arranged to receive hulls and seeds delivered from between the rotatable members, and having seed discharge openings in its bottom, a fan casing having a suction fan therein, a conduit connecting with said first-mentioned casing at a point above the said discharge openings thereof, and with said fan casing on the suction side of the fan, and means adjacent the suction end of the conduit, for creating a counter draft, and regulating the degree of said draft.

16. A grinder member slidably supporting a complemental grinder member therebeneath supported for rotation by a pulley, means for feeding material between the members, and a shaft slidably traversing the pulley and lower member and connecting with the upper member, said shaft being non-rotatable.

17. A pair of spaced grinder disks one slidable but non-rotatable and the other rotatably mounted but not slidable, a separator casing carried by and movable with the slidable member and inclosing the disks to receive ground material from between the same, said rotatable member being rotatably supported by a pulley and a non-rotatable rod slidable through the pulley and rotatable disk and secured for operating the other disk for sliding.

In witness whereof, I have hereunto set my hand this 18th day of May, 1925.

ANDREW V. CLELAND.